United States Patent [19]

Sammells

[11] Patent Number: 4,807,977
[45] Date of Patent: * Feb. 28, 1989

[54] MULTI-COLOR ELECTROCHROMIC CELLS HAVING SOLID POLYMER ELECTROLYTES AND A DISTINCT ELECTROCHROMIC LAYER

[75] Inventor: Anthony F. Sammells, Naperville, Ill.

[73] Assignee: Eltron Research, Inc., Aurora, Ill.

[*] Notice: The portion of the term of this patent subsequent to Jun. 14, 2005 has been disclaimed.

[21] Appl. No.: 879,027

[22] Filed: Jun. 26, 1986

[51] Int. Cl.$^4$ .............................. G02F 1/01
[52] U.S. Cl. .................................. 350/357
[58] Field of Search ..................... 350/357; 252/600

[56] References Cited

U.S. PATENT DOCUMENTS

| | | | |
|---|---|---|---|
| 3,443,855 | 5/1969 | Land et al. | 350/357 X |
| 4,231,641 | 11/1980 | Randin | 350/357 |
| 4,371,236 | 2/1983 | Nicholson | 350/357 |
| 4,550,982 | 11/1985 | Hirai | 350/357 |

FOREIGN PATENT DOCUMENTS 0048789 3/1984 Japan.
0057321 4/1985 Japan.

OTHER PUBLICATIONS

H. T. van Dam, "The Conductance of Heptylvidogen Dibromide in Water and Methanol", *J. Electrochem Soc.*, 123, 1181 (1976).
P. N. Moskalev and I. S. Kirin, "The Electrochromism of Lanthanide-Di-Phthalocyanines", *Russian Journal of Physical Chemistry*, 47, 1019 (1972).
P. N. Moskalev and I. S. Kirin, "Effects of the Electrode Potential on the Absorption Spectrum of a Rare--Earth Diphthalocyanine Layer;" *Opt. Spectrosc.*, 29, 220 (1970).
M. M. Nicholson and F. A. Pizzarello, "Charge Transport in Oxidation Product of Lutetium Diphtalocyanine," *J. Electrochem Soc.* 127, 2490 (1979).
M. M. Nicholson and F. A. Pizzarello, "Galvanostatic Transients in Lutetium Diphthalocyanine Films", *J. Electrochem Soc.*, Apr. 1980, pp. 821–827.
M. M. Nicholson and F. A. Pizzarello, "Cathodic Electrochromic of Lutetium Diphthalocyanine Films", J. Electrochem Soc., 128, 1740 (1981).
D. Walton, B. Ely, and G. Elliott, "Investigations into the Electrochromism of Lutetium and Ytterbium Diphthalocyanines," *J. Electrochem Soc.*, 128, 2479 (1981).
M. M. Nicholson and T. P. Weismuller, "Multicolor Electrochromic Display Technology," Technical Report No. 5, Office of Naval Research Contract No. 00014-77-C-0636, Task No. NR359-667 (1983).
R. J. Jasinski:, "The Electrochemistry of Some N-Heptylviologen Salt Solutions", *J. Electrochem. Soc.* 124, 637 (1977).
H. T. van Dam and J. J. Poujee, Electrochemically Generated Colored Films of Insoluble Viologen Radical Compounds, *J. Electrochem Soc.* 121, 155 (1974).
J. Broinink and C. G. A. Kregting, "The Voltammetric Behavior of Some Viologens at SnO$_2$ Electrodes," *J. Electrochem Soc.* 125, 1397 (1978).
B. Reichman, F. F. Fan and A. J. Bard, "Semiconductor Electrodes", J. Electrochem Soc. 127, 333 (1980).
M. M. Nicholson and T. P. Wiesmuller, Evidence of Electronic Conduction Due to Mixed Oxidation States in Lutetium Diphthalocyanine Films, Report No. 7 Office of Naval Research Contract No. 00014-7-7-C-0636, Task No. NR 359-667 (1975).

*Primary Examiner*—Eugene R. LaRoche
*Assistant Examiner*—Nathan W. McCutcheon
*Attorney, Agent, or Firm*—Thomas W. Speckman; Ann W. Speckman

[57] ABSTRACT

A solid-state multi-color electrochromic display cell having a distinct organic electrochromic chemical layer having one side immediately adjacent a display electrode and the other side adjacent a solid electrolyte.

12 Claims, 2 Drawing Sheets

MULTI-COLOR ELECTROCHROMIC CELLS HAVING SOLID POLYMER ELECTROLYTES AND A DISTINCT ELECTROCHROMIC LAYER

This invention was made as the result of work under Contract Number N00014-84-C-0723 granted by the Office of Naval Research. The Government has certain rights in this invention.

BACKGROUND OF THE INVENTION

1. Field of the Invention

This invention relates to multi-color electrochromic flat-panel displays embodying solid-state electrochromatic cells with solid polymer electrolytes. The electrochromic material, which is in a phase distinct from an ionically conducting polymer, changes color in response to small applied anodic or cathodic currents providing writing and erasure processes as a result of anodically or cathodically applying voltages to the cell. On open-circuit, the cell retains its state of charge or memory. The multi-color electrochromic cells using solid polymer electrolytes according to the present invention provide a display which is thin, compact, lightweight, sunlight readable, possessing open circuit memory, operable over a wide operating temperature range requiring low power input for operation.

2. Description of the Prior Art

Electrochromic effects of various chemicals and various chemical systems wherein specific chemicals undergo chemical reactions in response to small applied anodic or cathodic currents changing their color are known. Color changes, rates, and performance characteristics, are greatly dependent upon the electrochromic chemical used and the entire electrochromic system including the electrolyte and cell configuration. Electrochromic reactions of rare earth diphthalocyanines have been reported by P. N. Moskalev and I. S. Kirin, Opt. Spectrosc., 29, 220 (1970) and P. N. Moskalev and I. S. Kirin, Russ. J. Phys. Chem., 47, 1019 (b 1972). Color changes in a lutetium diphthalocyanine film on tin oxide in an aqueous electrolyte of KCl or $Na_2SO_4$ is described in M. M. Nicholson and F. A. Pizzarello, Charge Transport in Oxidation Product of Lutetium Diphthalocyanine, J. Electrochem Soc., 127, 2490 (1979) and M. M. Nicholson and F. A. Pizzarello, Galvanostatic Transients in Lutetium Diphthalocyanine Films. The cathodic and anodic electrochromism of lutetium diphthalocyanine films have been found dependent upon the specific aqueous and organic liquid electrolyte as well as other specific cell components as reported by M. M. Nicholson and F. A. Pizzarello, Cathodic Electrochromism of Lutetium Dipthalocyanine Films, J. Electrochem Soc., 128, 1740 (1981). Electrochromic action of other rare earth diphthalocyanines are recognized to be similar and electrochromic changes of lutetium and ytterbium diphthalocyanines are very similar in a number of aqueous and organic electrolyte liquids. D. Walton, B. Ely and G. Elliott, Investigations into the Electrochromism of Lutetium and Ytterbium Diphthalocyanines, J. Electrochem Soc., 128, 2479 (1981). The use of lutetium diphthalocyanine with aqueous and organic liquid electrolytes in electrochromic displays is described in M. M. Nicholson and T. P. Weismuller, Multicolor Electrochromic Display Technology, Technical Report No. 5, Office of Naval Research Contract N00014-77-C-0636, Task No. NR 359-667 (1983). Different electrochromic behavior of lutetium diphthalocyanine films in single boundary and dual boundary cell configurations using aqueous liquid electrolytes and emphasizing the need for aqueous electrolytes to promote ion transport is described in M. M. Nicholson and T. P. Wiesmuller, Evidence of Electronic Conduction Due to Mixed Oxidation States in Lutetium Diphthalocyanine Films, Report No. 7, Office of Naval Research Contract N00014-77-C-0636, Task No. NR 359-667 (1985).

The electrochromic action of 4,4'-dipyridinium compounds known as viologens in aqueous and organic liquid electrolyte systems is known. The action of n-heptylviologen in various salt liquid solutions showed dependence upon specific anions, cations and metal presence. R. J. Jasinski, The Electrochemistry of Some n-Heptylviologen Salt Solutions, J. Electrochem Soc., 124, 637 (1977). Large differences in redox potentials between ethylviologen and benzylviologen in aqueous and organic liquid solvents have been noted. H. T. van Dam and J. J. Poujee, Electrochemically Generated Colored Films of Insoluble Viologen Radical Compounds, J. Electrochem Soc., 121, 1555 (1974). The electrochromic changes of diheptylviologen film on tin oxide electrodes in an aqueous electrolyte are described in J. Bruinink and C. G. A. Kregting, The Voltammetric Behavior of Some Viologens at $SnO_2$ Electrodes, J. Electrochem Soc., 125, 1397 (1978). Photoreduction of aqueous solutions of heptylviologen bromide on p-GaAs in the form of photoelectrochemical cells is described in B. Reichman, F. F. Fan and A. J. Bard, Semiconductor Electrodes, J. Electrochem Soc., 127, 333 (1980). The differing conductance of helptylviologen in aqueous and organic solvents is described in H. T. van Dam, The Conductance of Heptylviologen Dibromide in Water and Methanol, J. Electrochem Soc., 123, 1181 (1976).

Solid-state electrochromic displays are taught by U.S. Pat. No. 4,550,982 wherein an organic electrochromic material and an ionic material are provided in a polymeric layer. The organic electrochromic material is associated with the polymeric material either as integrated macromolecules or polymer molecules, or as pendant macromolecules by covalent bonding, or is dispersed in the polymeric layer.

Other electrochromic displays using solid polymer electrolytes are described in Japanese Patent Application Publication No. 84/37804, Matsushita Electric Industrial Co. Ltd., using pyridinium materials and in Japanese Patent Application No. 82/223451, Publication No. 84/113422, teaching a solid acrylic resin tetrathiofulvalene having a lithium borofluoride polymer display.

SUMMARY OF THE INVENTION

The electrochromic cells of this invention have a distinct phase of electrochromic material on the display electrode substrate and may be generally described as shown in FIG. 4.

The electrochromic half cell has a display electrode formed of tin oxide or a mixture of indium oxide and tin oxide as a film on a transparent plate. According to the present invention, the organic electrochromic chemical is in the form of a distinct layer having one side on or immediately adjacent the display electrode. Any water soluble or water insoluble organic electrochromic chemical may be used, such as the rare earth diphthalocyanines and alkylviologens. The other side of the electrochromic layer is immediately adjacent an ionically conducting polymer layer containing a supporting electrolyte. A supporting electrolyte within the ionically conducting polymer layer is to provide high overall ionic conductivity in the final cell, thereby providing low internal resistance losses in the final cell. When a water soluble electrochromic chemical is used a water insoluble or non-water containing polymer is used to maintain the distinct electrochromic chemical layer. When a water insoluble electrochromic chemical is used either a water insoluble or non-water containing polymer or a water soluble or water containing polymer may be used. An insoluble cation conducting membrane, such as Nafion 117, may be used as a separator between the electrochromic half cell and the counter half cell.

The counter half cell has a counter electrode which may be any conductive material and may be the same as or different than the display electrode. An ionically conducting polymer layer containing a supporting electrolyte is between the counter electrode and the separator layer. An electroactive redox material is either in association with the surface of the counter electrode as a discrete layer or is associated with the ionically conducting polymer layer between the counter electrode and the separator to maintain redox electrochemistry in this compartment upon the passage of either anodic or cathodic currents. Thus, the electrochromic cells of this invention provide all solid-state cells.

It is an object of this invention to provide all solid-state multi-color electrochromic cells.

It is a further object of this invention to provide all solid-state multi-color electrochromic display cells having a distinct organic electrochromic layer.

Still another object of this invention is to provide all solid-state multi-color electrochromic display cells suitable for sunlight readable multi-color flat-panel display operable with low input voltage and power.

BRIEF DESCRIPTION OF THE DRAWING

These and other objects and advantages of this invention will become apparent upon reading the preferred embodiments with reference to the drawing wherein.

DESCRIPTION OF PREFERRED EMBODIMENTS

Figure 1:
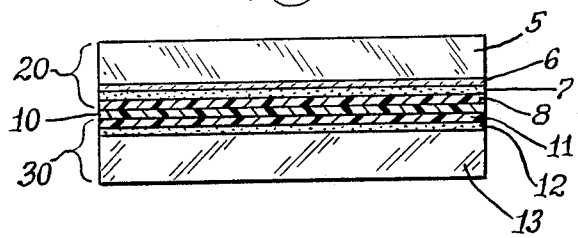
FIG. 1 is a section of one embodiment of a multi-color electrochromic cell of this invention.

Referring to FIG. 1, an electrochromic cell of one embodiment of this invention is shown schematically in cross section wherein the organic electrochromic half cell 20 is separated from counter half cell 30 by insoluble cation conducting membrane 10. Electrochromic half cell 20 comprises transparent plate 5, display electrode layer 6, organic electrochromic chemical layer 7, and ionically conducting polymer and supporting electrolyte layer 8. The electrochromic cell may be encased in any suitable casing to enclose a sealed space and any suitable means for exterior electrical contact with the electrodes may be provided. In FIG. 1, the thickness of the layers are not meant to convey actual thicknesses, but are generally exaggerated for illustration purposes.

Transparent plate 5 may be fabricated from any substantially transparent material such as glass or a transparent plastic sheet. Display electrode layer 6 is a tin oxide film or an indium oxide and tin oxide film which may be applied to transparent plate 5 by spraying, CVD technique, or by precipitation. Methods of fabrication of such display electrodes are known to the art.

The discrete organic electrochromic chemical layer 7 consists essentially of a suitable organic electrochromic material which may be sprayed, precipitated or evaporated onto display electrode layer 6. The electrochromic layer is thus immediately adjacent the electronically conducting film of the display electrode providing high efficiency and rapid response time. The organic electrochromic chemical may include known organic electrochromic materials such as tetrathiafulvalen, arylpyrazoline, fluorene, benzoquinone, naphthoquinone, anthraquinone, pyrylium, pyridium, methylene blue, furil, other aromatic or heterocyclic compounds, and their derivatives, ferroine, ferrocene, complexes of diphthalocyanine and rare earth metals, and other organometallic compounds, and viologens. Preferred electrochromic chemicals for use in the cells of this invention are selected from the group consisting of rare earth diphthalocyanines and alkylviologens. Rare earth diphthalocyanines include lutetium, ytterbium, gadolinuim, neodymium, europium, lanthanum, cerium, erbidium and yttrium. Particularly preferred electrochromic chemicals for use in the cells of this invention are selected from the group consisting of lutetium diphthalocyanine and heptylviologen. The electrochromic chemical used in the cells of this invention may be water soluble or water insoluble. Suitable thicknesses of the discrete organic electrochromic chemical layer used in the cells of this invention is about 40Å to about 20,000Å, about 200Å to about 10,000Å being preferred.

Any alkali ion conducting polymer is suitable for use as the ionically conducting polymer associated with the supporting electrolyte to form the solid electrolyte layer 8. It is preferred that the polymer have a functional group with a strong polarity. Suitable polymer materials include melamine resin, silicon resin, xylene resin, vinyl acetate resin, copolymer resin of vinyl chloride and vinyl acetate, polycarbonate resin, resin of cellulose derivatives, polyvinyl carbazole resin, polyether resin, such as polyethylene oxide and polypropylene oxide, acrylic resin, such as polyacrylonitrile and polymethacrylonitrile, and fluororesin, such as polyvinylidene fluoride. Preferred ionically conducting polymers include poly(phosphazenes), poly(ethylene oxide), poly(propylene oxide), perfluorosulfonic acid sold under registered trademark NAFION ® by E. I. duPont de Nemours and Company, poly(styrene sulfonic acid) known as PSSA, poly-2-acrylamido-2-methyl propane sulfonic acid known as poly-AMPS, poly(ethylene sulfonic acid) known as PESA, poly(oxyethylene), poly(methacrylate), poly(ethylene succinate), poly(vinyl acetate), polyacrylonitrile, poly(vinylidene fluoride) and poly(tetramethylene oxide). When a water soluble organic electrochromic chemical is used, a water insoluble or non-water containing polymer may be used to maintain the distinct electrochromic chemical layer. When a water insoluble electrochromic chemical is used, either a water insoluble or non-water containing polymer or a water soluble or water containing polymer may be used. By the term "water containing polymer", I mean polymers such as described by Jean-Paul Randin in Ion-Containing Polymers as Semi-Solid Electrolytes in WO$_3$-based Electrochromic Devices, J. Electrochem. Soc. 129, 1215 (1982). The polymers may include a cross-linking or bridge-bonding additive to serve as a stabilizer and to enhance adhesion to adjacent layers. Such additives are known to the polymer art and include functional groups of oxygen, sulfur, nitrogen, halogen and the like capable of reacting with the macromolecules upon application of light or heat to form cross-linking or bridge-bonding of the macromolecules. The polymers may also include a plasticizer to aid in dissociation of ionic material. Plasticizers are known to the polymer art including phthalic diesters such as dioctyl phthalate and dipentyl phthalate, esters of aliphatic dibasic acids such as dioctyl adipate, phosphoric esters such as dibutyl phosphate, ether compounds such as o-nitrophenyloctyl ether and diphenyl ether, glycol ester, epoxy compounds, and polymers of such plasticizers. Other suitable plasticizers include propylene carbonate, ethylene carbonate, $\gamma$-butylolactone, like materials with high dielectric constant, and organic compounds which are used as liquid crystals such as N-(4-ethoxybenzilidene-4'-n-butylaniline). The polymers may also include an antioxidant and/or an ultraviolet ray absorbing material as known to the polymer art as a stabilizer.

The supporting electrolyte may comprise any ion conductive materials as known to the art such as alkali metal halides, alkaline earth metal halides, rare earth metal halides, halogenoalkyl ammonium, their solid solutions, a complex of an alkali metal halide and crown ether, halogenopyridines exemplified by iodo-1-n-butyl pyridinum, and like halogen ion conductive material, its hydrates, and alkali ion conductive materials, such as oxides of transition metals serving as alkali ion conductive materials, alkali metal halides which serve also as halogen ion conductive materials, alkali metal perchlorates, alkali metal tetrafluoroborates, alkali metal hexafluorophosphates, alkali metal nitrides, alkali metal aluminum tetrafluorides, alkali metal aluminum tetrachlorides, alkali metal thiocyanates, alkali metal trifluoroacetates, M$_{14}$Zn(GeO$_4$), and M-beta-alumina, where M represents an alkali metal, silver conductive materials, such as silver halides, and copper conductive materials, such as copper halides, and surfactants. Particularly preferred are sodium sulfate, potassium chloride, sodium hexafluorophosphate, lithium and sodium methanetrifluorosulfonate. Suitable concentrations for the supporting electrolyte are about 0.001M to about 0.2M.

Separator 10 between electrochromic half cell 20 and counter half cell 30 may be any cation conducting membrane which is insoluble in the ionically conducting polymers and supporting electrolytes on each side of it or other materials in the cell environment. Suitable cation conducting membranes for use as separators in cells of this invention include perfluorinated carboxylic and sulfonic cationic exchange copolymers (the Nafions), poly(ethylene oxide), poly(propylene oxide), and poly(phosphazenes). In addition the solid-state cell can be effectively operated using anionic polymeric conductors such as cross linked copolymers of vinylmonomers possessing quaternary ammonium anion exchange groups (Ionics 103-PZL-386). The separator must possess sufficient ionic conductivity to result in low internal resistance (IR) losses in the total cell and to permit migration of the conducting ions from one cell compartment to another.

The counter half cell 30 counter electrode 13 may be made of any suitable electrode material providing desired electrical conductance such as gold, silver, copper, carbon, aluminum, nickel and iron, or may be the same material as the display electrode comprising transparent plate 5 and display electrode layer 6. Ionically conducting polymer layer 11 with supporting electrolyte is between counter electrode 13 and separator 10. Electroactive chemical 12 may be any suitable redox electroactive chemical known to the art and may be in association with the surface of counter electrode 13 as a discrete layer, or may be dissolved in the supporting electrolyte or dispersed in the supporting electrolyte. Suitable redox materials for facilitating transfer of electric charges to and from counter electrode 13 include $Cr^{3+}/Cr^{2+}$, $Cu^+/Cu^{2+}$, $Ce^{3+}$-$Ce^{4+}$ and $Fe^{2+}/Fe^{3+}$. While inorganic redox couples are preferred, organic redox couples such as quinones are suitable. Redox materials should be present in concentrations of about 0.01M to about 0.2 M.

One or both electrochromic chemical layer 6 and electroactive chemical layer 12 may contain a conductive powder additive such as tin oxide, a mixture of indium and tin oxides (ITO), titanium oxide coated with stannic oxide, and carbon. Powder particle sizes are generally in the range of about 0.1 to about 100 microns.

The following examples set forth specific materials and embodiments in detail and are intended to exemplify the invention only and not to limit it in any way.

EXAMPLE I

A solid state electrochromic cell using lutetium diphthalocyanine and solid poly-AMPS polymer electrolyte was prepared and cyclic voltammograms showed successful cyclic reversibility.

Lutetium diphthalocyanine was prepared by direct solid-state reaction between lutetium acetate and o-phthalonitrile (Alfa) using procedures as described in P. N. Moskalev and I. S. Kirin, Russ. J. Phys. Chem., 47, 1019 (1972). The absorption spectra of the LuH(Pc)$_2$ obtained after dissolution in chloroform showed a major peak at 630 nm with a minor shoulder being present at 710 nm. LuH(Pc)$_2$ was evaporated (using an Edwards 306A thin-film evaporator) at $10^{-5}$ torr onto an SnO$_2$ conducting glass substrate. This resulted in a pale green film being deposited possessing a thickness of 2600Å. This deposition thickness was estimated based on the amount of charge that had to be passed through the solid-state cell to affect a given color change.

Solid-state cells were prepared by applying a thin film approximately 2 microns of poly-AMPS as a 10 wt. percent solution containing 0.1M Na$_2$SO$_4$ as a supporting electrolyte, onto the deposited LuH(Pc)$_2$ film. After initially drying one hour, this electrode was directly contacted to Nafion 117. The counter electrode compartment consisted of a similar poly-AMPS film placed between the Nafion and SnO$_2$ conducting glass with redox electrochemistry being maintained upon cell cycling by the presence of 0.04M CeCl$_3$. After pressing both of these half-cells together, the resultant solid-state cell was permitted to dry a further thirty minutes.

Figure 2:
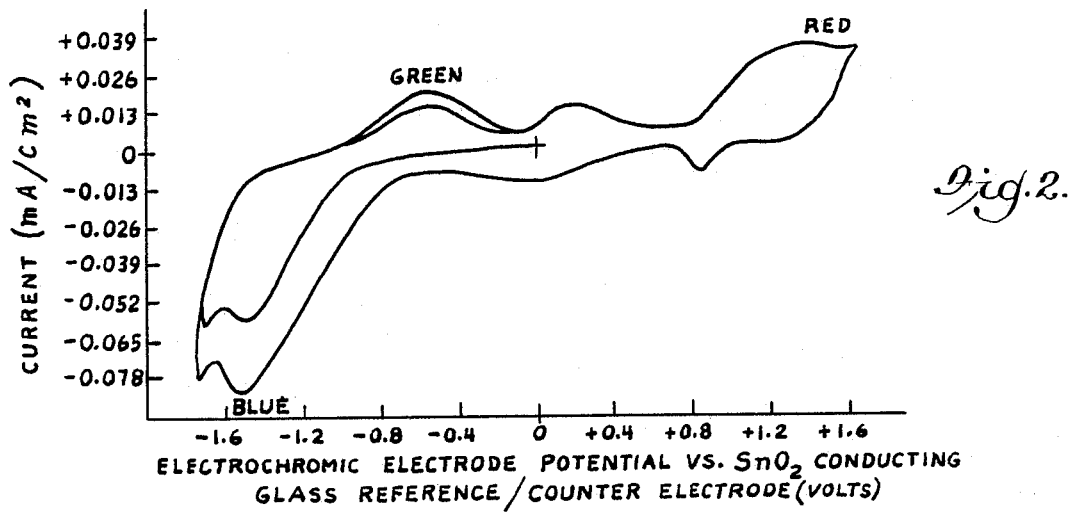
FIG. 2 shows cyclic voltammetry measurements on a cell of one embodiment of this invention as described in Example I.

Cyclic voltammetry (CV) measurements on cells possessing Na$_2$SO$_4$ as a supporting electrolyte are shown in FIG. 2. The scan rate was 15 mV/sec. The logistics associated with these thin solid-state cells inhibited the use of a reference electrode. Consequently, working electrode potentials are recorded as a function of the CeCl$_3$ containing SnO$_2$ counter electrode compartment. Initial cathodic scan of the working electrode compartment resulted in the LuH(Pc)$_2$ film becoming bright blue at $-1.5$ V vs. SnO$_2$ glass with no further color change occurring at more negative potentials. Subsequent anodic scan resulted in the reappearance of the initial LuH(Pc)$_2$ green color as represented by the oxidation peak at $-0.6$ V. The LuH(Pc)$_2$ thin-film then became red upon scanning to 1.3 V.

These color changes were found quite reversible upon repeated anodic and cathodic voltage scanning. Upon cathodic scan from 1.6 V to $-1.6$ V, the lutetium compound changed color directly from red to blue without the intermediate green. This latter color only appeared upon anodic scan starting from the initially reduced blue species.

EXAMPLE II

Figure 3:
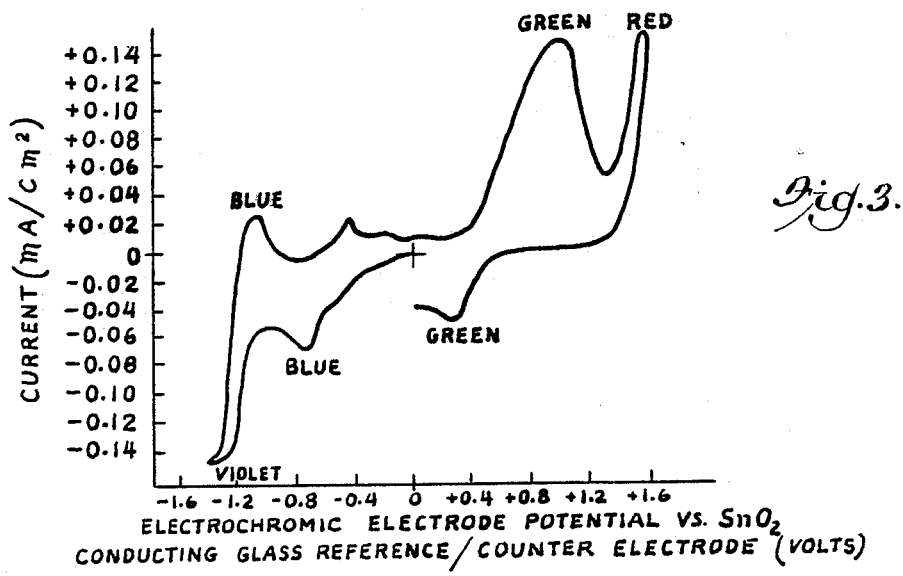
FIG. 3 shows cyclic voltammetry measurements on a cell of another embodiment of this invention as described in Example II.
Figure 4:
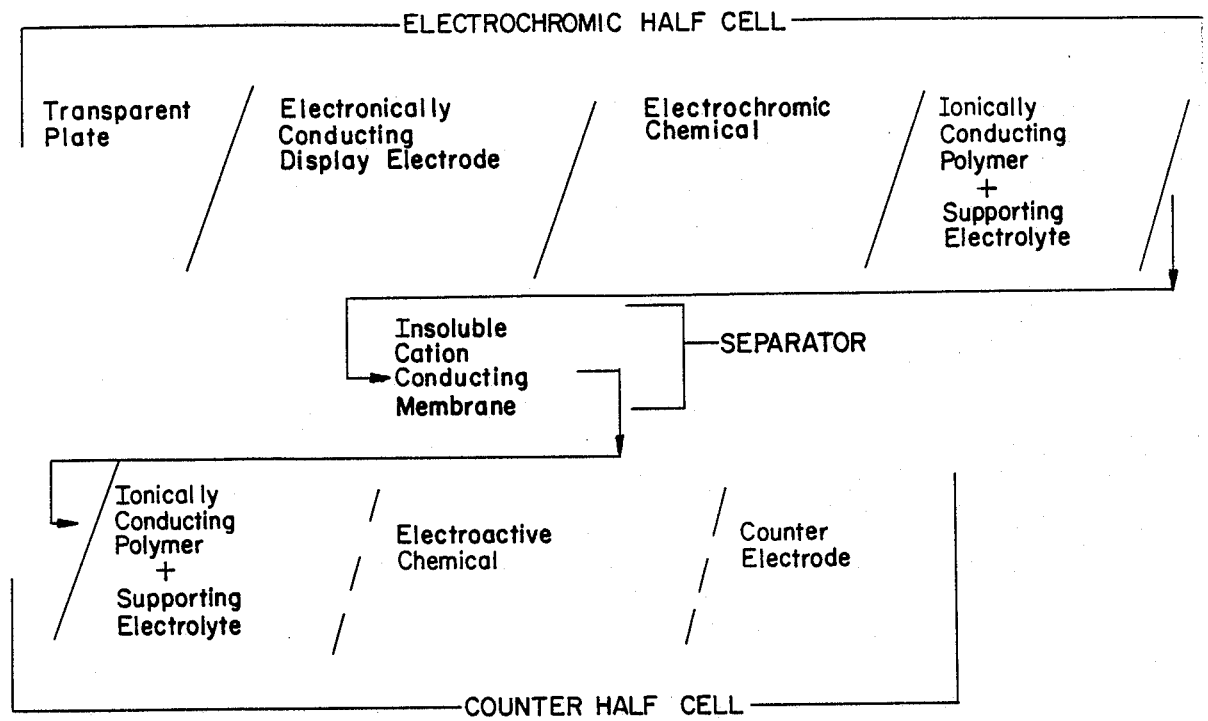
FIG. 4 is a simplified schematic showing an electrochemical cell according to this invention.

A cell identical to the cell described in Example I was fabricated except the supporting electrolyte was poly-AMPS with 0.1M KCl substituted for Na$_2$SO$_4$ as used in Example I. Cyclic voltammetry measurements with a scan rate of 20 mV/sec are shown in FIG. 3.

Upon cathodic potential scan, the initially green LuH(Pc)$_2$ thin-film became blue (at $-0.8$ V) and then violet (at $-1.3$ V) vs. the SnO$_2$ counter electrode. Reversing scan direction (anodic) returned the blue color at $-1.1$ V, the initial green deposit at $-1.5$ V vs. the SnO$_2$ counter electrode.

In comparison to cells using Na$_2$SO$_4$ as the supporting electrolyte, the KCl containing polymer returned the initial green LuH(Pc)$_2$ species at 0.2 V upon cathodic scan from the initially oxidized red species formed at 1.5 V. Additionally, the presence of KCl promoted formation of the violet reduced species at $-1.3$ V. Again, these color changes were quite distinct and electrochemically reversible.

The above results show that the observed electrochromic effect in the solid polymer electrolyte cells has some dependency upon the supporting electrolyte in the ionically conducting polymer. Unexpectedly, formation of the violet reduction product is not contingent upon the absence of alkali cations as taught by Nicholson and Pizzarello (1981), supra.

While in the foregoing specification this invention has been described in relation to certain preferred embodiment thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A solid-state multi-color electrochromic display cell comprising an electrochromic half cell, a counter half cell, and a separator therebetween, said electrochromic half cell comprising a display electrode comprising an electronically conducting film on a substantially transparent plate and a distinct electrochromic layer consisting essentially of an organic electrochromic chemical having one side immediately adjacent said electronically conducting film and further comprising a solid electrolyte layer comprising an ionically conducting polymer and a supporting electrolyte between said electrochromic layer and said separator, said separator comprising an insoluble cation conducting membrane and said counter half cell comprising an ionically conducting polymer layer with supporting electrolyte immediately adjacent said separator, a redox electroactive chemical and a counter electrode.

2. A solid-state multi-color electrochromic display cell of claim 1 wherein said organic electrochromic chemical is selected from the group consisting of rare earth diphthalocyanines and alkylviologens.

3. A solid-state multi-color electrochromic display cell of claim 1 wherein said organic electrochromic chemical is selected from the group consisting of lutetium diphthalocyanine and heptylviologen.

4. A solid-state multi-color electrochromic display cell of claim 1 wherein said organic electrochromic chemical is lutetium diphthalocyanine.

5. A solid-state multi-color electrochromic display cell of claim 1 wherein said electrochromic layer has a thickness of about 40Å to about 20,000Å.

6. A solid-state multi-color electrochromic display cell of claim 1 wherein said organic electrochromic chemical is water soluble and said ionically conducting polymer is water insoluble.

7. A solid-state multi-color electrochromic display cell of claim 1 wherein said organic electrochromic chemical is water insoluble and said ionically conducting polymer is selected form the group consisting of water soluble and water insoluble polymers.

8. A solid-state multi-color electrochromic display cell of claim 1 wherein said ionically conducting polymer is selected from the group consisting of poly(phosphazenes), poly(ethylene oxide), poly(propylene oxide), perfluorosulfonic acid, poly(styrene sulfonic acid), poly-2-acrylamido-2-methyl propane sulfonic acid, poly(ethylene sulfonic acid), poly(oxyethylene), poly(methacrylate), poly(ethylene succinate), poly(vinyl acetate), polyacrylonitrile, poly(vinyliene fluoride) and poly(tetramethylene oxide).

9. A solid-state multi-color electrochromic display cell of claim 1 wherein said supporting electrolyte is selected from the group consisting of sodium sulfate, potassium chloride, sodium hexafluorophosphate, lithium methanetrifluorosulfonate and sodium methaneotrifluorosulfonate, said supporting electrolyte present in concentration of about 0.001M to about 0.2M.

10. A solid-state multi-color electrochromic display cell of claim 1 wherein said redox electroactive chemical is in a discrete layer between said counter electrode and said ionically conducting polymer layer with supporting electrolyte.

11. A solid-state multi-color electrochromic display cell of claim 1 wherein said redox electroactive chemical is dissolved in said supporting electrolyte.

12. A solid-state multi-color electrochromic display cell of claim 1 wherein said redox electroactive chemical is dispersed in said supporting electrolyte.

* * * * *